US011068181B2

United States Patent
Vankamamidi et al.

(10) Patent No.: US 11,068,181 B2
(45) Date of Patent: Jul. 20, 2021

(54) GENERATING AND STORING MONOTONICALLY-INCREASING GENERATION IDENTIFIERS

(71) Applicant: EMC IP Holding Company LLC, Hopkinton, MA (US)

(72) Inventors: Vamsi K. Vankamamidi, Hopkinton, MA (US); Socheavy Heng, Framingham, MA (US); Philippe Armangau, Acton, MA (US); Christopher A. Seibel, Walpole, MA (US); James McCoy, Holliston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/655,690

(22) Filed: Oct. 17, 2019

(65) Prior Publication Data

US 2021/0117085 A1    Apr. 22, 2021

(51) Int. Cl.
*G06F 3/06* (2006.01)
*G06F 12/0817* (2016.01)
*G06F 12/0882* (2016.01)

(52) U.S. Cl.
CPC ............ *G06F 3/064* (2013.01); *G06F 3/0619* (2013.01); *G06F 3/0631* (2013.01); *G06F 3/0656* (2013.01); *G06F 3/0665* (2013.01); *G06F 3/0679* (2013.01); *G06F 3/0683* (2013.01); *G06F 12/0828* (2013.01); *G06F 12/0882* (2013.01)

(58) Field of Classification Search
CPC ...... G06F 3/0619; G06F 3/0631; G06F 3/064; G06F 3/0656; G06F 3/0665; G06F 3/0679; G06F 3/0683; G06F 3/0688; G06F 12/0828; G06F 12/0882; G06F 11/2056–2087
See application file for complete search history.

(56) References Cited

U.S. PATENT DOCUMENTS

| | | | |
|---|---|---|---|
| 8,799,601 | B1 | 8/2014 | Chen et al. |
| 9,305,071 | B1 | 4/2016 | Bono et al. |
| 9,612,754 | B1 | 4/2017 | Delgado et al. |
| 9,727,479 | B1 | 8/2017 | Armangau et al. |
| 10,037,341 | B1 | 7/2018 | Bassov et al. |
| 10,146,456 | B1 | 12/2018 | Gao et al. |
| 10,402,096 | B2 | 9/2019 | Sen et al. |

(Continued)

*Primary Examiner* — Reginald G Bragdon
*Assistant Examiner* — Curtis James Kortman
(74) *Attorney, Agent, or Firm* — BainwoodHuang

(57) ABSTRACT

A data storage system in which a transaction is generated that indicates at least one data block of a logical volume to be written to non-volatile data storage of a data, and in which the logical volume is accessible to multiple nodes in the data storage system. A system-wide lock is obtained for each data block indicated by the transaction. A new generation identifier is then created that is equal to a last transaction identifier that was created and stored during processing of a previously completed transaction. Each data block indicated by the transaction is stored into the non-volatile data storage of the data storage system together with the new generation identifier and the last transaction identifier is updated before each system-wide lock on each data block indicated by the transaction is released.

15 Claims, 6 Drawing Sheets

(56) References Cited

U.S. PATENT DOCUMENTS

| | | | |
|---|---|---|---|
| 2004/0080558 A1* | 4/2004 | Blumenau | G06F 11/1435 |
| | | | 347/19 |
| 2005/0149683 A1* | 7/2005 | Chong, Jr. | G06F 11/1466 |
| | | | 711/162 |
| 2007/0005874 A1* | 1/2007 | Dodge | G06F 3/0619 |
| | | | 711/103 |
| 2016/0124661 A1* | 5/2016 | Kurita | G06F 3/0616 |
| | | | 711/114 |
| 2016/0241666 A1* | 8/2016 | Chapman | H04L 67/2842 |
| 2017/0116247 A1* | 4/2017 | Jonsson | G06F 9/52 |

* cited by examiner

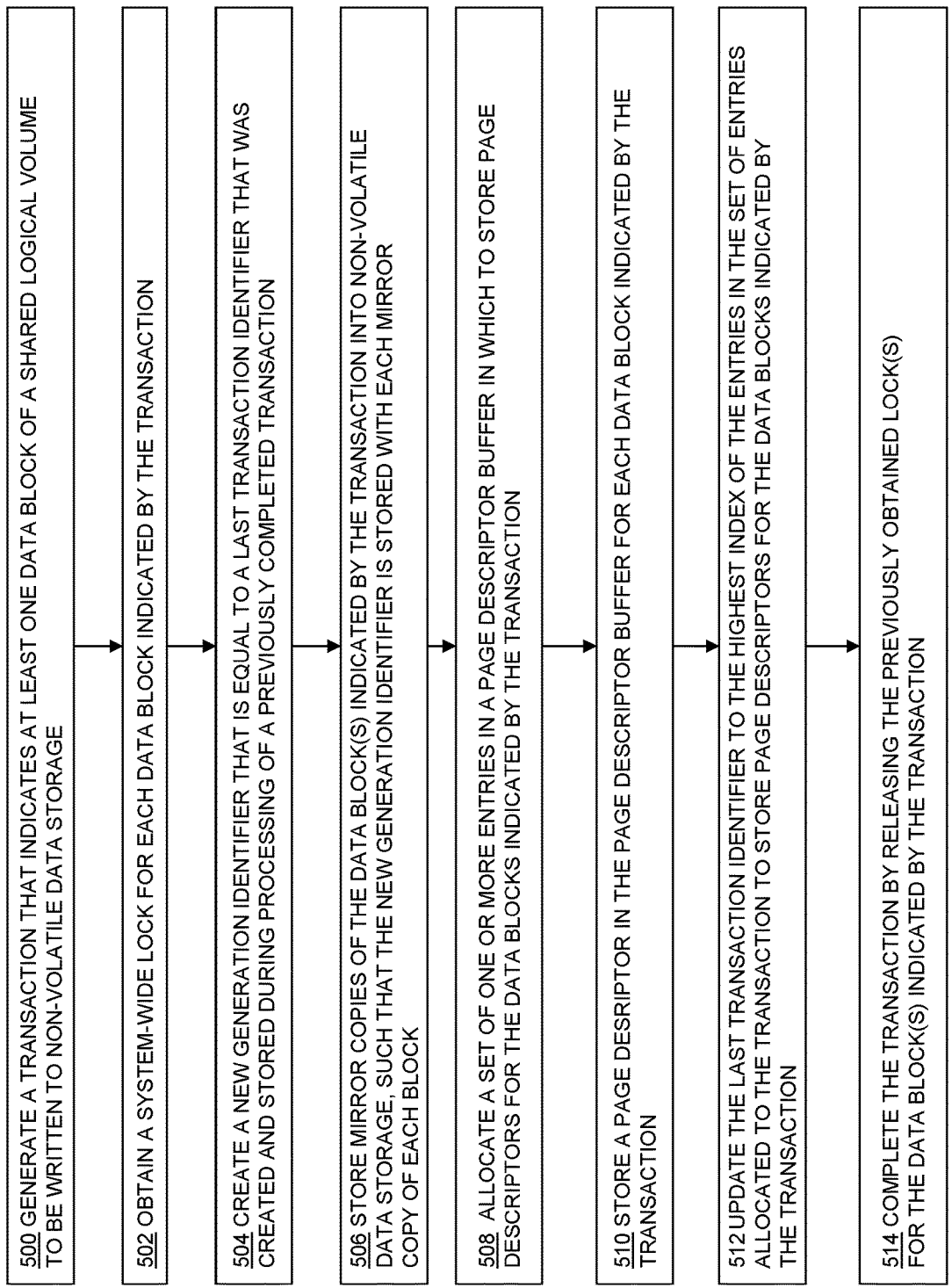

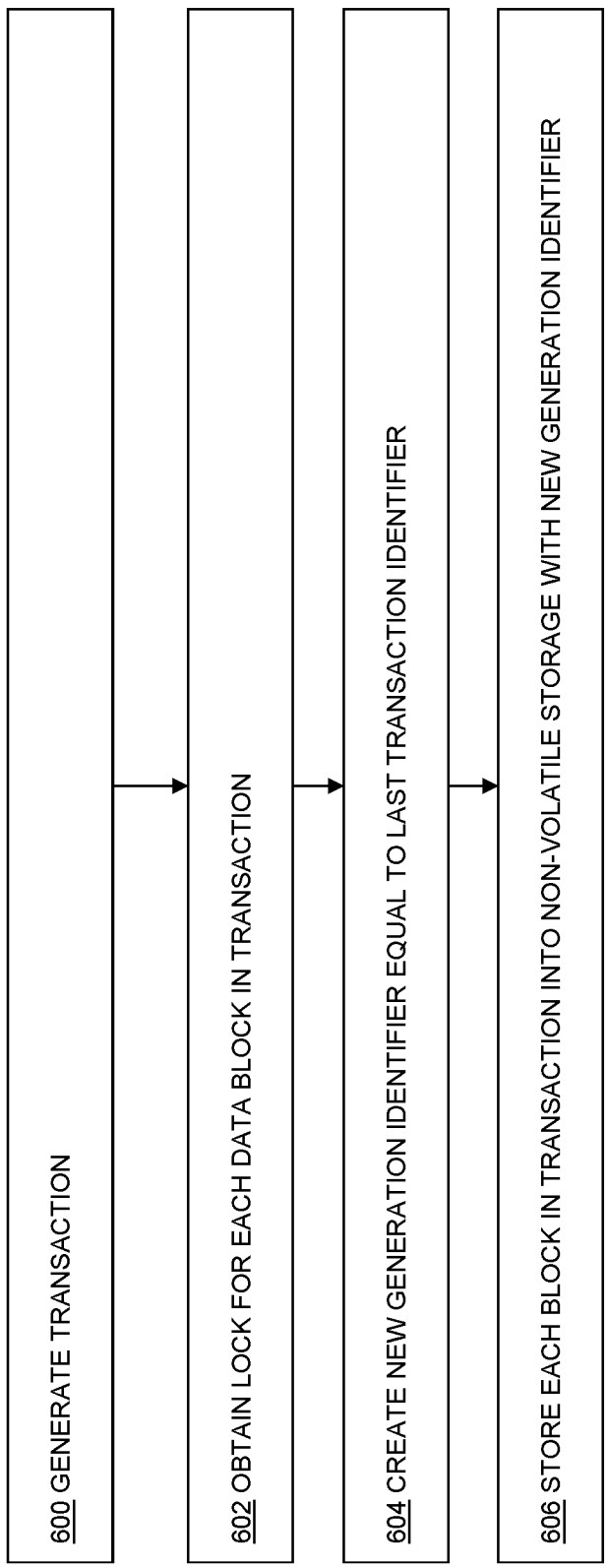

GENERATING AND STORING MONOTONICALLY-INCREASING GENERATION IDENTIFIERS

TECHNICAL FIELD

The disclosed technology relates generally to securely storing data in a data storage system, and more specifically to technology for generating monotonically-increasing generation identifiers that are stored with data in non-volatile data storage of a multi-node transactional data storage system.

BACKGROUND

Data storage systems are arrangements of hardware and software that include and/or access non-volatile data storage (e.g. electronic flash drives, magnetic disk drives, and/or optical drives, cloud storage, etc.) that is used to provide non-volatile data storage for processing I/O (Input/Output) requests (i.e. writes and/or reads) that are received from one or more hosts (e.g. host computers and/or applications executing thereon). The host I/O requests that are processed by a data storage system may include block I/O requests as well as file I/O requests. The host I/O requests indicate host data that is stored in storage objects (e.g. logical volumes) of non-volatile data storage that are contained in and maintained by the data storage system. The data storage system may also perform various data storage related services that organize and secure the host data on the non-volatile data storage of the data storage system.

SUMMARY

While processing received host I/O requests and/or providing data storage related services, a data storage system may often need to store data (e.g. host data and/or metadata generated by the data storage system while processing host data) together with additional values that can be used to assist in recovering from certain failures. For example, a generation identifier may be stored with each block of data each time the block is written. Subsequently, a stored generation identifier may be used to perform a verification operation to determine which one of multiple copies of a corresponding data block is the most recent generation of data. For example, if a data block is mirrored across two or more non-volatile data storage devices, such that multiple copies of the data block are present at the time that a verification operation is performed, then a copy of the data block having the highest generation identifier may be selected as the current version of the data block, and then that copy may be used to replace all other copies of the data block that have smaller generation identifiers, in order to bring all copies up to date.

In addition, in the case where data blocks can be written from multiple nodes of a data storage system, any generation identifier created for a new version of a data block must be synchronized across all the nodes of the system. Otherwise, one node writing a data block could use a lower generation identifier than was previously used by another node that wrote the same block. Such an event could potentially result in a verification operation overwriting a newer version of the data block with an older version.

Some technologies have attempted to use current clock-time as a generation identifier, in an attempt to ensure that each most recent write of a data block has the highest generation identifier. However, such approaches may fail to always generate monotonically increasing generation identifiers, due to the clock-time drift that may occur between different nodes, which may result in a node performing a later write to the data block having a lower current clock-time than was used by a peer node that earlier wrote to the same data block, resulting in the generation identifier for the later version of the data block being lower than the generation identifier for the earlier version.

In another example, read-modify-write operations could be used whenever a data block is changed, such that the previous generation identifier is first read from each data block, and then incremented by one to generate the new generation identifier. However, such approaches have a negative performance impact, since reads of the data block are required just to obtain the previous generation identifier, even in cases where only a write operation is actually needed.

To address the above described and other technical shortcomings of previous systems, new technology is disclosed herein in which a transaction is generated that indicates at least one data block of a logical volume to be written to non-volatile data storage of a data storage system, and in which the logical volume is accessible to multiple nodes in the data storage system. A lock is obtained for each data block indicated by the transaction. A new generation identifier is then created that is equal to a last transaction identifier that was created and stored during processing of a previously completed transaction. Each data block indicated by the transaction is stored into the non-volatile data storage of the data storage system together with the new generation identifier.

For example, storing each data block indicated by the transaction into the non-volatile data storage of the data storage system together with the new generation identifier may include or consist of storing a separate copy of each data block indicated by the transaction together with the new generation identifier onto each one of multiple non-volatile data storage devices.

In another example, storing a separate copy of each data block indicated by the transaction together with the new generation identifier onto each one of multiple non-volatile data storage devices may include or consist of storing a separate copy of each data block indicated by the transaction together with the new generation identifier onto each one of a set of physical extents provisioned from the multiple non-volatile data storage devices.

In another example, in response to successfully storing all of the data blocks indicated by the transaction into the non-volatile data storage of the data storage system, i) a set of one or more entries for the transaction may be allocated in a page descriptor buffer for the logical volume to store page descriptors for the data blocks indicated by the transaction, ii) a page descriptor for each data block indicated by the transaction may be stored into a corresponding one of the entries in the set of entries allocated for the transaction in the page descriptor buffer, and iii) the last transaction identifier may be updated to a highest index of the entries in the set of entries allocated for the transaction in the page descriptor buffer.

In another example, the multiple nodes in the data storage system may include a single primary node, and allocating the set of entries for the transaction in the page descriptor buffer for the logical volume may include or consist of i) requesting the set of entries for the transaction from page descriptor allocation logic executing exclusively in the primary node of the data storage system, and ii) receiving an indication of the set of entries for the transaction from the page descriptor allocation logic executing in the primary node, the indication of the set of entries for the transaction indicating the locations of entries in the set of entries within the page descriptor buffer.

In another example, in response to all of the data blocks indicated by the transaction being successfully stored into the non-volatile data storage of the data storage system, i) a set of one or more page descriptors may be allocated for the transaction in a page descriptor buffer for the logical volume, ii) a page descriptor for each data block indicated by the transaction may be stored into a corresponding one of the page descriptors in the set of page descriptors allocated for the transaction in the page descriptor buffer, and iii) the last transaction identifier may be updated to a highest index of the indices of the page descriptors in the set of page descriptors allocated for the transaction in the page descriptor buffer.

In another example, the multiple nodes in the data storage system may include a single primary node, and allocating the set of page descriptors for the transaction in the page descriptor buffer for the logical volume may include or consist of i) requesting the set of page descriptors for the transaction from page descriptor allocation logic executing exclusively in the primary node of the data storage system, and ii) receiving an indication of the set of page descriptors from the page descriptor allocation logic executing in the primary node, e.g. an indication of the set of page descriptors that includes a range of indices within the page descriptor buffer for the set of page descriptors.

In another example, obtaining the lock for each data block indicated by the transaction may include or consist of locking each data block indicated by the transaction across all nodes of the data storage system, such that each data block indicated by the transaction cannot be accessed by any of the multiple nodes in the data storage system to process any other transaction until the lock obtained for that data block is released.

In another example, in response to the last transaction identifier being successfully updated with the highest index of the page descriptors in the set of page descriptors allocated for the transaction in the page descriptor buffer, each lock may be released that was previously obtained for each data block indicated by the transaction.

In another example, a data verification operation may be performed for a data block that was previously stored into non-volatile data storage of the data storage system at least in part by i) comparing a generation identifier stored with a first copy of the previously stored data block to a generation identifier stored with a second copy of the previously stored data block, and ii) in response to the generation identifier stored with the first copy of the previously stored data block being higher than the generation identifier stored with the second copy of the previously stored data block, overwriting the second copy of the previously stored data block with the first copy of the previously stored data block.

The disclosed technology provides significant improvements over previous technologies. The disclosed technology advantageously ensures that monotonically-increasing generation identifiers are created as new versions of data blocks are written by multiple nodes of a data storage system. Generation identifiers created by the disclosed technology can accordingly be used to perform data verification operations that determine which one of multiple copies of an individual data block is the most recent generation. Specifically, a copy of a given data block with the highest generation identifier may be identified (e.g. during a data verification operation or the like) as the most current version of the data block, and then that copy can be used to replace all other copies of the data block that have smaller generation identifiers, in order to bring all the copies of the data block up to date, e.g. to recover from the loss of one or more write operations. The disclosed technology advantageously operates without using clock-time as a generation identifier, thus avoiding synchronization issues that may arise due to current clock times drifting between different nodes. The disclosed technology also advantageously operates without the requirement of using read-modify-write operations for every change to a data block, thus avoiding the negative performance impact that such approaches introduce in cases where only a write operation is required.

BRIEF DESCRIPTION OF THE DRAWINGS

The foregoing and other objects, features and advantages will be apparent from the following description of particular embodiments of the disclosed technology, as illustrated in the accompanying drawings in which like reference characters refer to the same parts throughout the different views. The drawings are not necessarily to scale, emphasis instead being placed on illustrating the principles of various embodiments of the disclosed technology.

FIG. 5 is a first flow chart illustrating steps that may be performed during operation of some embodiments; and FIG. 6 is a second flow chart illustrating steps that may be performed during operation of some embodiments.

DETAILED DESCRIPTION

Figure 1:
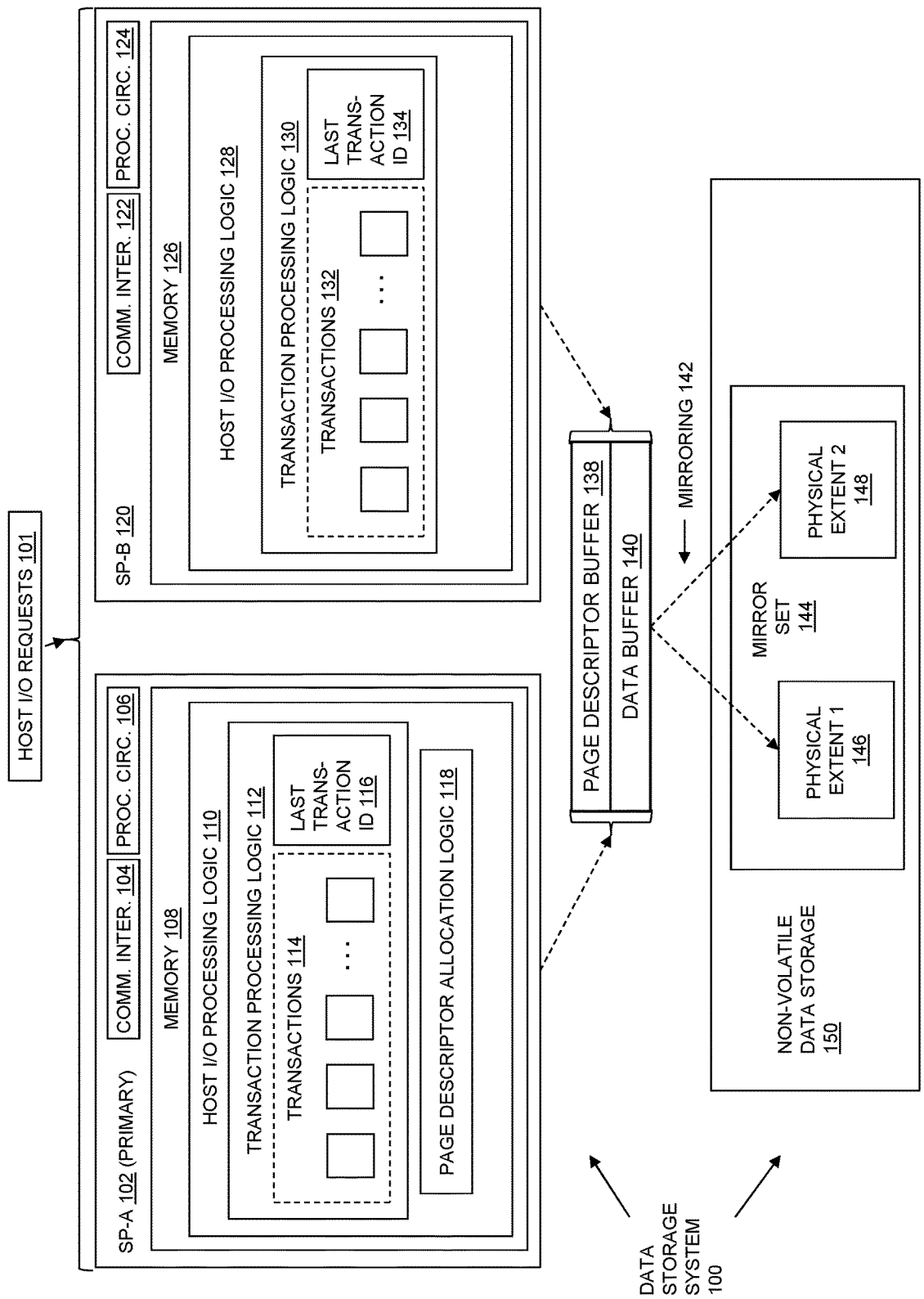
FIG. 1 is a block diagram showing an example of components in some embodiments while storing blocks of data to non-volatile data storage with monotonically increasing generation identifiers.

Embodiments of the invention will now be described. The embodiments described herein are only examples of how features and principles of the invention may be embodied. The invention itself is accordingly broader than the specific embodiments described herein.

The technology disclosed herein generates transactions that each indicate at least one data block of a logical volume to be written to non-volatile data storage of a data storage system. The logical volume is shared, in that it is accessible to multiple nodes in the data storage system. For a given transaction, a lock is obtained for each data block indicated by the transaction. A new generation identifier is then created that is equal to a last transaction identifier that was created and stored during processing of a previously completed transaction. Each data block indicated by the transaction is stored into the non-volatile data storage of the data storage system together with the new generation identifier.

In some embodiments, each data block indicated by the transaction may be stored into the non-volatile data storage of the data storage system together with the new generation identifier at least in part by storing a separate copy of each data block indicated by the transaction together with the new generation identifier onto each one of multiple non-volatile data storage devices of the data storage system.

In some embodiments, a separate copy of each data block indicated by the transaction may be stored together with the new generation identifier onto each one of multiple non-volatile data storage devices at least in part by storing a separate copy of each data block indicated by the transaction together with the new generation identifier onto each one of a set of physical extents provisioned from the multiple non-volatile data storage devices.

In some embodiments, in response to successfully storing all of the data blocks indicated by the transaction into the non-volatile data storage of the data storage system, the disclosed technology may i) allocate a set of one or more entries for the transaction in a page descriptor buffer for the logical volume to store page descriptors for the data blocks indicated by the transaction, ii) store a page descriptor for each data block indicated by the transaction into a corresponding one of the entries in the set of entries allocated for the transaction in the page descriptor buffer, and iii) update the last transaction identifier to a highest index of the entries in the set of entries allocated for the transaction in the page descriptor buffer.

In some embodiments, the multiple nodes in the data storage system may include a single primary node, and the disclosed technology may allocate the set of entries for the transaction in the page descriptor buffer for the logical volume at least in part by i) requesting the set of entries for the transaction from page descriptor allocation logic executing exclusively in the primary node of the data storage system, and ii) receiving an indication of the set of entries for the transaction from the page descriptor allocation logic executing in the primary node, the indication of the set of entries for the transaction indicating the locations of entries in the set of entries within the page descriptor buffer.

In some embodiments, the lock for each data block indicated by the transaction may be obtained at least in part by locking each data block indicated by the transaction across all nodes of the data storage system, such that each data block indicated by the transaction cannot be accessed by any of the multiple nodes in the data storage system to process any other transaction until the lock obtained for that data block is released.

In some embodiments, in response to the last transaction identifier being successfully updated with the highest index of the page descriptors in the set of page descriptors allocated for the transaction in the page descriptor buffer, each lock may be released that was previously obtained for each data block indicated by the transaction.

In some embodiments, a data verification operation may be performed for a data block that was previously stored into non-volatile data storage of the data storage system at least in part by i) comparing a generation identifier stored with a first copy of the previously stored data block to a generation identifier stored with a second copy of the previously stored data block, and ii) the second copy of the previously stored data block being overwritten with the first copy of the previously stored data block in response to detecting that the generation identifier stored with the first copy of the previously stored data block is higher than the generation identifier stored with the second copy of the previously stored data block.

FIG. 1 shows an example of an operational environment in which embodiments of the disclosed technology may operate, and an illustrative embodiment of components of the disclosed technology. FIG. 1 shows a Data Storage System 100 that may be accessed by one or more host computers (not shown), and/or by host applications executing in whole or in part on one or more host computers. For example, the host computers and/or applications executing thereon may access non-volatile data storage provided by Data Storage System 100 over one or more computer and/or communication networks. The host computers and/or applications that access Data Storage System 100 may consist of or include one or more physical computers, and/or one or more virtual machines executing in a virtual execution environment.

The network or networks over which host computers and/or applications access Data Storage System 100 may include or consist of any type of network or combination of networks, such as, for example, a storage area network (SAN), a local area network (LAN), a wide area network (WAN), the Internet, and/or some other type of communication or computer network or combination of networks.

Data Storage System 100 includes multiple nodes referred to herein as storage processors, and shown for purposes of illustration by SP-A 102 and SP-B 120. Host computers and/or applications may logically connect to and communicate with one or both of SP-A 102 and/or SP-B 120 using various technologies. For example, Host I/O Requests 101 conveyed by host computers and/or applications to SP-A 102 and/or SP-B 120 may include block I/O requests (read requests and/or write requests) that are communicated to SP-A 102 and/or SP-B 120 using block storage interfaces and protocols such as, for example, the Small Computer System Interface (SCSI), Fibre Channel (FC), Serial Attached SCSI (SAS), Internet Small Computer System Interface (iSCSI), and/or other block storage interfaces and/or protocols. Host I/O Requests 101 conveyed by host computers and/or applications to SP-A 102 and/or SP-B 120 may further include file I/O requests (read requests and/or write requests) communicated to SP-A 102 and/or SP-B 120 using file storage interfaces and protocols such as, for example, the Network File System (NFS) distributed file system protocol, the Server Message Block (SMB)/Common Internet File System (CIFS) application-layer network protocol, Apple Filing Protocol (AFP), and/or other file storage interfaces and/or protocols. SP-A 102 and/or SP-B 120 may accordingly be configured to receive host I/O requests through block-based and/or file-based storage protocols, and to respond to host I/O requests of either type by reading host data from and/or writing host data to Non-Volatile Data Storage 150, as further described below.

Data Storage System 100 further includes Non-Volatile Data Storage 150 that is communicably connected to both SP-A 102 and SP-B 120. Non-Volatile Data Storage 150 includes some number of non-volatile data storage devices that are communicably connected either directly or indirectly to SP-A 102 and SP-B 120. For example, one or more of the non-volatile data storage devices in Non-Volatile Data Storage 150 may be connected to SP-A 102 and SP-B 120 through a high speed bus, such as PCI Express (Peripheral Component Interconnect Express) or the like, and/or using one or more cables or communication media, such as SAS (Serial-Attached SCSI (Small Computer System Interface)) cables, and/or through one or more Ethernet cables, and/or through other specific types of communication media and/or one or more communication or computer networks.

The non-volatile data storage devices in Non-Volatile Data Storage 150 may include non-volatile data storage devices such as electronic flash drives, magnetic disk drives, optical drives, and/or other specific types of non-volatile data storage devices.

Data Storage System 100 may include two or more storage processors like SP-A 102 and SP-B 120. In some embodiments, multiple storage processors may be provided as circuit board assemblies, or "blades," which plug into a chassis that encloses and cools the storage processor. Those skilled in the art will recognize, however, that no particular configuration of multiple storage processors is required, and that the storage processors in Data Storage System 100, such as SP-A 102 and SP-B 120, may be any type of physical or virtual computing device that is capable of processing host I/O requests.

Each storage processor may include one or more communication interfaces, processing circuitry, and memory coupled to the processing circuitry. For example, SP-A 102 includes Communication Interfaces 104, Processing Circuitry 106, and Memory 108 coupled to Processing Circuitry 106, and SP-B 120 includes Communication Interfaces 122, Processing Circuitry 124, and Memory 126 coupled to Processing Circuitry 124.

The communication interfaces of each storage processor may include, for example, SCSI target adapters and/or network interface adapters that convert electronic and/or optical signals received over a network or communication bus into electronic form for use by the storage processor. The processing circuitry of each storage processor may, for example, be embodied as at least one processor core that is capable of reading and executing threads of program instructions as they are scheduled for execution. The processing circuitry of each storage processor may be integrated into a single central processing unit chip or chip package, and/or may be a subset of the total number of processor cores contained in the storage processor.

The memory of each storage processor may, for example, include or consist of relatively high speed, volatile memory, e.g. Dynamic Random Access Memory (DRAM). The processing circuitry and memory of each storage processor together may form specialized control circuitry, which is constructed and arranged to carry out specific methods and functions as described herein. As shown in FIG. 1, the memory of each storage processor stores specialized software components and data structures that may be provided at least in part in the form of executable program instructions. When the executable instructions of the software components stored in the memory of a storage processor are executed by the processing circuitry of that storage processor, the processing circuitry performs the methods and functionality of the software described herein. Although certain specific software constructs are shown in FIG. 1 and described herein, those skilled in the art will recognize that the memory of each storage processor in the Data Storage System 100 may further include various other types of software constructs, which are not shown.

In the example of FIG. 1, the software components in the memory of each storage processor includes host I/O processing logic, shown in SP-A 102 by Host I/O Processing Logic 110, and in SP-B 120 by Host I/O Processing Logic 128. The host I/O processing logic in each storage processor provides program logic for processing and/or supporting the processing of Host I/O Requests 101 that may be received by that storage processor, and/or program logic for providing one or more data storage related services, and/or program logic that generates metadata while processing and/or supporting the processing of Host I/O Requests 101 and/or providing one or more data storage related services.

Host I/O Requests 101 may include host I/O read requests and host I/O write requests that are directed to various types of block data objects that are hosted by Data Storage System 100 using non-volatile data storage space that is provisioned from the non-volatile data storage devices in Non-Volatile Data Storage 150. Such block data objects may, for example, include logical volumes, logical units sometimes referred to as "LUNs", and/or block-based virtual volumes (VVols). Host I/O Requests 101 may also or alternatively include host I/O requests (e.g. host I/O read requests, host I/O write requests) directed to file data objects, such as files or file systems, that are also hosted by Data Storage System 116 using non-volatile data storage space that is also allocated from the non-volatile data storage devices in one or more of the storage enclosures.

In some embodiments, during operation of the components shown in FIG. 1, program logic executing in SP-A 102 and/or SP-B 120 divides the physical non-volatile data storage space located on each one of the non-volatile data storage devices in Non-Volatile Data Storage 150 into multiple equal-sized physical extents (PEs), where each physical extent consists of a contiguous area of physical non-volatile data storage space. The disclosed technology may be embodied using any specific size of physical extents.

In some embodiments, program logic executing in SP-A 102 and/or SP-B 120 may provision multiple physical extents that are each located on a different non-volatile data storage device within Non-Volatile Data Storage 150 to support mirroring of data that is written to a shared logical volume by SP-A 102 and/or SP-B 120 across the provisioned physical extents. For example, as shown in FIG. 1, Physical Extent 1 146 and Physical Extent 2 148 may be provisioned as a Mirror Set 144 to store mirror copies of a shared logical volume that is accessible to both SP-A 102 and SP-B 120. For example, Physical Extent 1 146 may be located on a one non-volatile data storage device in Non-Volatile Data Storage 150, and Physical 2 148 may located on another non-volatile data storage device in Non-Volatile Data Storage 150. While the Mirror Set 144 in the example shown in FIG. 1 includes two physical extents located on two different non-volatile data storage devices, the disclosed technology is not limited mirroring performed across a mirror set that includes two physical extents, and alternatively Mirror Set 144 may include numbers of physical extents that are greater than two.

Both SP-A 102 and SP-B 120 include transaction processing logic that generates and processes transactions that write data to the shared logical volume of non-volatile data storage that is accessible to both SP-A 102 and SP-B 120. For example, SP-A 102 includes Transaction Processing Logic 112 that generates and processes Transactions 114, and SP-B 120 includes Transaction Processing Logic 130 that generates and processes Transactions 132. Each transaction that is generated by the transaction processing logic executing in either one of the storage processors indicates at least one data block of the shared logical volume that is to be written to Non-Volatile Data Storage 150 as a result of processing that transaction, e.g. one or more data blocks that are to be mirrored across all physical extents in the Mirror Set 144. For example, each data block that is to be written by a given transaction may be indicated by a logical block number or the like indicating the position of the data block within the logical volume.

When initially starting the processing of each individual transaction, the transaction processing logic disclosed herein obtains a lock for each data block indicated by the transaction. In some embodiments, the lock for each data block indicated by the transaction may be obtained at least in part by locking each data block indicated by the transaction across all nodes of the data storage system, e.g. across both SP-A 102 and SP-B 120. In such embodiments, after each data block indicated by the transaction has been locked, each data block indicated by the transaction cannot be accessed by any of the multiple nodes in Data Storage System 100 (e.g. SP-A 102 and/or SP-B 120) to process any other transaction until the lock for that data block is subsequently released.

For example, when starting the processing of each one of Transactions 114, Transaction Processing Logic 112 obtains a lock for each data block indicated by the transaction. The lock obtained by Transaction Processing Logic 112 for each data block indicated by the transaction may be obtained at least in part by locking each data block indicated by the transaction across both SP-A 102 and SP-B 120, such that each data block indicated by the transaction cannot be accessed by either Transaction Processing Logic 112 and/or Transaction Processing Logic 130 to process any other transaction until the lock for that data block is released by Transaction Processing Logic 112.

Similarly, when starting the processing of each one of Transactions 132, Transaction Processing Logic 130 obtains a lock for each data block indicated by the transaction. The lock obtained by Transaction Processing Logic 130 for each data block indicated by the transaction may be obtained at least in part by locking each data block indicated by the transaction across both SP-A 102 and SP-B 120, such that each data block indicated by the transaction cannot be accessed by either Transaction Processing Logic 112 and/or Transaction Processing Logic 130 to process any other transaction until the lock for that data block is released by Transaction Processing Logic 130.

Also while processing each individual transaction, subsequent to and/or in response to obtaining the lock for each data block indicated by the transaction, the transaction processing logic disclosed herein creates a new generation identifier that is equal to a last transaction identifier that was previously created and stored during processing of a previously completed transaction, e.g. during processing of a transaction that was completed prior to the start of processing of the transaction currently being processed (i.e. during processing of a transaction that was completed prior to the transaction processing logic obtaining the locks for each data buffer indicated by the transaction currently being processed).

For example, while processing each one of Transactions 114, subsequent to and/or in response to obtaining the lock for each data block indicated by the transaction, Transaction Processing Logic 112 creates a new generation identifier for the transaction that is equal to a last transaction identifier that was previously created and stored by Transaction Processing Logic 112 during processing of a previously completed one of the transactions in Transactions 114. For example, in some embodiments, Transaction Processing Logic 112 may create the new generation identifier by reading Last Transaction Identifier 116 from Memory 108, such that the new generation identifier is set to the current value of Last Transaction Identifier 116, and Last Transaction Identifier 116 may include or consist of a transaction identifier that was created and stored by Transaction Processing Logic 112 during processing of a previously completed one of the transactions in Transactions 114.

Similarly, while processing each one of Transactions 132, subsequent to and/or in response to obtaining the lock for each data block indicated by the transaction, Transaction Processing Logic 130 may create a new generation identifier for the transaction that is equal to a last transaction identifier that was created and stored by Transaction Processing Logic 130 during processing of a previously completed one of the transactions in Transactions 132. For example, in some embodiments, Transaction Processing Logic 130 may create the new generation identifier by reading Last Transaction Identifier 134 from Memory 126, such that the new generation identifier is set to the current value of Last Transaction Identifier 134, and Last Transaction Identifier 134 may include or consist of a transaction identifier that was created and stored by Transaction Processing Logic 128 during processing of a previously completed one of the transactions in Transactions 132.

Also while processing each individual transaction, subsequent to and/or in response to creation of a new generation identifier that is equal to a last transaction identifier that was created and stored during processing of a previously completed transaction, the transaction processing logic disclosed herein stores each data block indicated by the transaction, together with the new generation identifier, into the Non-Volatile Data Storage 150. In some embodiments, the disclosed transaction processing logic may store each data block indicated by the transaction into Non-Volatile Data Storage 150, together with the new generation identifier, at least in part by storing a separate copy of each data block indicated by the transaction together with the new generation identifier onto each one of multiple non-volatile data storage devices in Non-Volatile Data Storage 150. In some embodiments, the transaction processing logic disclosed herein may store a separate copy of each data block indicated by the transaction together with the new generation identifier onto each one of multiple non-volatile data storage devices in Non-Volatile Data Storage 150 at least in part by storing a separate copy of each data block indicated by the transaction together with the new generation identifier onto each physical extent in the Mirror Set 144 of physical extents provisioned from the non-volatile data storage devices in Non-Volatile Data Storage 150, e.g. into Physical Extent 1 146 and Physical Extent 2 148.

In some embodiments, when storing the data blocks indicated by a transaction together with the new generation identifier to Non-Volatile Data Storage 150, the transaction processing logic may store each data block into a portion of one or more mirrored data buffers for the logical volume, as illustrated in FIG. 1 by Data Buffer 140. Data Buffer 140 may be stored in Non-Volatile Data Storage 150, and may be mirrored (e.g. at 142 in FIG. 1 by the transaction processing logic or other program logic, and/or by program logic executing within the Non-Volatile Data Storage 150) across each physical extent in Mirror Set 144, e.g. across Physical Extent 1 146 and Physical Extent 2 148, thus enabling the transaction processing logic to store copies of the data blocks with the new generation identifier into each physical extent in Mirror Set 144.

For example, while processing each one of Transactions 114, subsequent to and/or in response to creation of a new generation identifier that was stored during processing of a previously completed transaction (e.g. by reading Last Transaction Identifier 116 from Memory 108), Transaction Processing Logic 112 may store each data block indicated by the transaction, together with the new generation identifier, into the Non-Volatile Data Storage 150. In some embodiments, Transaction Processing Logic 112 may store each data block indicated by the transaction into Non-Volatile Data Storage 150 together with the new generation identifier at least in part by storing a separate copy of each data block indicated by the transaction together with the new generation identifier onto each one of multiple non-volatile data storage devices in Non-Volatile Data Storage 150. In some embodiments, Transaction Processing Logic 112 may store a separate copy of each data block indicated by the transaction together with the new generation identifier onto each one of multiple non-volatile data storage devices in Non-Volatile Data Storage 150 at least in part by storing a separate copy of each data block indicated by the transaction together with the new generation identifier onto each physical extent in a mirror set of physical extents provisioned from the non-volatile data storage devices in Non-Volatile Data Storage 150.

Similarly, while processing each one of Transactions 132, subsequent to and/or in response to creation of a new generation identifier that was stored during processing of a previously completed transaction (e.g. by reading Last Transaction Identifier 134 from Memory 126), Transaction Processing Logic 130 may store each data block indicated by the transaction into the Non-Volatile Data Storage 150, together with the new generation identifier. In some embodiments, Transaction Processing Logic 130 may store each data block indicated by the transaction into Non-Volatile Data Storage 150 together with the new generation identifier at least in part by storing a separate copy of each data block indicated by the transaction together with the new generation identifier onto each one of multiple non-volatile data storage devices in Non-Volatile Data Storage 150. In some embodiments, Transaction Processing Logic 130 may store a separate copy of each data block indicated by the transaction together with the new generation identifier onto each one of multiple non-volatile data storage devices in Non-Volatile Data Storage 150 at least in part by storing a separate copy of each data block indicated by the transaction together with the new generation identifier onto each physical extent in a mirror set of physical extents provisioned from the non-volatile data storage devices in Non-Volatile Data Storage 150.

Also while processing each individual transaction, subsequent to and/or in response to all of the data blocks indicated by the transaction being successfully stored into the Non-Volatile Data Storage 150 of the Data Storage System 100, the transaction processing logic disclosed herein may i) allocate a set of one or more entries for the transaction in a Page Descriptor Buffer 138 for the logical volume, in which to store page descriptors for the data blocks indicated by the transaction, ii) store a page descriptor for each data block indicated by the transaction into a corresponding one of the entries in the set of entries allocated for the transaction in the Page Descriptor Buffer 138, and iii) update the last transaction identifier to a highest index of the entries in the set of entries allocated for the transaction in the Page Descriptor Buffer 138. For example, Page Descriptor Buffer 138 may be stored in Non-Volatile Data Storage 150, and may be mirrored (e.g. by the transaction processing logic or other program logic at 142 in FIG. 1) across each physical extent in Mirror Set 144, e.g. across Physical Extent 1 146 and Physical Extent 2 148. Further for example, each page descriptor stored by the transaction processing logic into one of the entries in the set of entries allocated for the transaction in the Page Descriptor Buffer 138 may include the locations in Physical Extent 1 146 and Physical Extent 2 148 of into which copies of a corresponding one of the data blocks indicated by the transaction were successfully written by the transaction processing logic.

For example, while processing each one of Transactions 114, subsequent to and/or in response to all of the data blocks indicated by the transaction being successfully stored into the Non-Volatile Data Storage 150 of the Data Storage System 100, Transaction Processing Logic 112 may i) allocate a set of one or more entries for the transaction in Page Descriptor Buffer 138, in which to store page descriptors for the data blocks indicated by the transaction, ii) store a page descriptor for each data block indicated by the transaction into a corresponding one of the entries in the set of entries allocated for the transaction in the Page Descriptor Buffer 138, and iii) update Last Transaction Identifier 116 to equal the highest index of the entries in the set of entries allocated for the transaction in the Page Descriptor Buffer 138.

Similarly, while processing each one of Transactions 132, subsequent to and/or in response to all of the data blocks indicated by the transaction being successfully stored into the Non-Volatile Data Storage 150 of the Data Storage System 100, Transaction Processing Logic 130 may i) allocate a set of one or more entries for the transaction in Page Descriptor Buffer 138, in which to store page descriptors for the data blocks indicated by the transaction, ii) store a page descriptor for each data block indicated by the transaction into a corresponding one of the entries in the set of entries allocated for the transaction in the Page Descriptor Buffer 138, and iii) update Last Transaction Identifier 134 to equal the highest index of the entries in the set of entries allocated for the transaction in the Page Descriptor Buffer 138.

In some embodiments, the multiple nodes in the data storage system may include a single primary node. For example, as shown in FIG. 1, SP-A 102 may be the primary node in Data Storage System 100. Page Descriptor Allocation Logic 118 executes exclusively on the primary node SP-A 102, and is solely responsible for the allocation of entries in the Page Descriptor Buffer 138. Page Descriptor Allocation Logic 118 allocates entries in the Page Descriptor Buffer 138 in response to requests it receives from Transaction Processing Logic 112 and Transaction Processing Logic 130. In such embodiments, while processing each individual transaction, the transaction processing logic disclosed herein may allocate the set of entries for the transaction in Page Descriptor Buffer 138 at least in part by i) requesting the set of entries for the transaction from Page Descriptor Allocation Logic 118, and ii) receiving an indication of the set of entries allocated for processing the transaction from Page Descriptor Allocation Logic 118. The indication of the range of entries allocated for processing the transaction may, for example, include or consist of a range of indices corresponding to a set of contiguous entries within the Page Descriptor Buffer 138, or some other specific type of indication.

For example, while processing each one of Transactions 114, Transaction Processing Logic 112 may allocate the set of entries for the transaction in Page Descriptor Buffer 138 at least in part by i) requesting the set of entries for the transaction from Page Descriptor Allocation Logic 118, and ii) receiving an indication of the set of entries allocated for processing the transaction from Page Descriptor Allocation Logic 118. Similarly, while processing each one of Transactions 132, Transaction Processing Logic 130 may allocate the set of entries for the transaction in Page Descriptor Buffer 138 at least in part by i) requesting the set of entries for the transaction from Page Descriptor Allocation Logic 118, and ii) receiving an indication of the set of entries allocated for processing the transaction from Page Descriptor Allocation Logic 118.

Also while processing each individual transaction, subsequent to and/or in response to the last transaction identifier being successfully updated with the highest index of the page descriptors in the set of page descriptors allocated for the transaction in the Page Descriptor Buffer 138, the transaction processing logic disclosed herein may release each lock that was previously obtained for each data block indicated by the transaction. The release of the locks that were previously obtained for the data blocks indicated by the transaction may cause the data blocks indicated by the transaction to again be accessible, e.g. by program logic executing in any of the nodes of the Data Storage System 100.

For example, while processing each one of Transactions 114, subsequent to and/or in response to Last Transaction Identifier 116 being successfully updated with the highest index of the page descriptors in the set of page descriptors allocated for the transaction in the Page Descriptor Buffer 138, Transaction Processing Logic 112 may release each lock that was previously obtained for each data block indicated by the transaction. Similarly, while processing each one of Transactions 132, subsequent to and/or in response to Last Transaction Identifier 134 being successfully updated with the highest index of the page descriptors in the set of page descriptors allocated for the transaction in the Page Descriptor Buffer 138, Transaction Processing Logic 130 may release each lock that was previously obtained for each data block indicated by the transaction.

In some embodiments, the transaction processing logic disclosed herein may perform a data verification operation for a data block that was previously stored into Non-Volatile Data Storage 150. During the data verification operation, the transaction processing logic may compare a generation identifier stored with a first copy of the previously stored data block to a generation identifier stored with a second copy of the previously stored data block. The transaction processing logic may then overwrite the second copy of the previously stored data block with the first copy of the previously stored data block in response to detecting that the generation identifier stored with the first copy of the previously stored data block is higher than the generation identifier stored with the second copy of the previously stored data block.

For example, Transaction Processing Logic 112 may perform a data verification operation for a data block that was previously stored into Non-Volatile Data Storage 150. During the data verification operation, Transaction Processing Logic 112 may compare a generation identifier stored with a copy of the previously stored data block in Physical Extent 1 146 to a generation identifier stored with a copy of the previously stored data block in Physical Extent 2 148. Transaction Processing Logic 112 may then overwrite the copy of the previously stored data block in Physical Extent 2 148 with the copy of the previously stored data block in Physical Extent 1 146 response to detecting that the generation identifier stored with the copy of the previously stored data block in Physical Extent 1 146 is higher than the generation identifier stored with the copy of the previously stored data block in Physical Extent 2 148.

Similarly, Transaction Processing Logic 130 may perform a data verification operation for a data block that was previously stored into Non-Volatile Data Storage 150. During the data verification operation, Transaction Processing Logic 130 may compare a generation identifier stored with a copy of the previously stored data block in Physical Extent 1 146 to a generation identifier stored with a copy of the previously stored data block in Physical Extent 2 148. Transaction Processing Logic 130 may then overwrite the copy of the previously stored data block in Physical Extent 2 148 with the copy of the previously stored data block in Physical Extent 1 146 response to detecting that the generation identifier stored with the copy of the previously stored data block in Physical Extent 1 146 is higher than the generation identifier stored with the copy of the previously stored data block in Physical Extent 2 148.

While the above examples of a data verification operation detect that a copy of a previously stored data block in Physical Extent 1 146 has a higher generation identifier than a copy of the previously stored data block in Physical Extent 2 148, the transaction processing logic may alternatively detect that the copy of the previously stored data block in Physical Extent 2 148 has a higher generation identifier than the copy of the previously stored data block in Physical Extent 1 146, in which case the copy of the previously stored data block in Physical Extent 1 146 is overwritten with the copy of the previously stored data block in Physical Extent 2 148.

Figure 2:
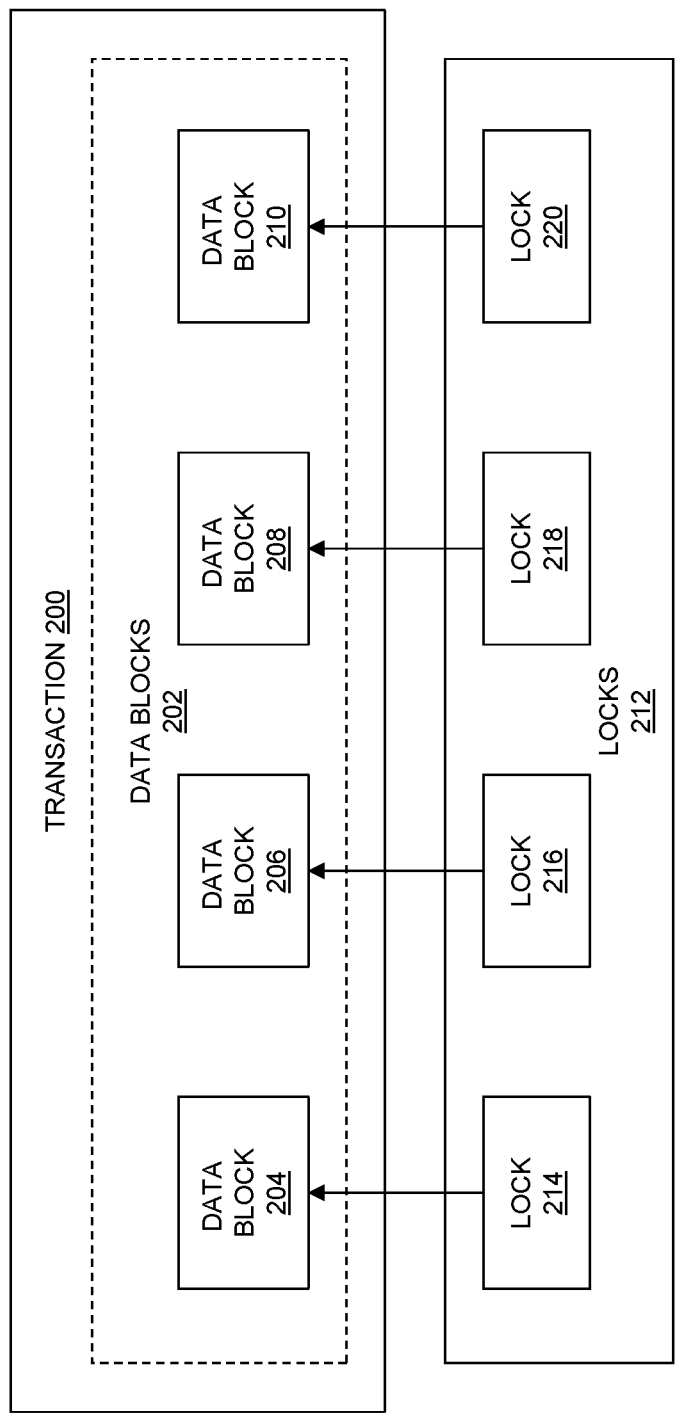
FIG. 2 is a block diagram showing an example of a transaction indicating a number of data blocks to be written to non-volatile data storage, after locks have been obtained for each data block indicated by the transaction.

FIG. 2 shows an example of a Transaction 200. In the example of FIG. 2, Transaction 200 indicates four data blocks, shown by Data Block 204, Data Block 206, Data Block 208, and Data Block 210. For example, Transaction 200 may include or contain a logical offset or logical address (e.g. a logical block number or the like) for each one of Data Block 204, Data Block 206, Data Block 208, and Data Block 210, and the specific data that is to be written to non-volatile data storage for each one of Data Block 204, Data Block 206, Data Block 208, and Data Block 210 when Transaction 200 is processed may be stored in memory, at a location in memory that is associated with (e.g. mapped to) the logical offset or logical address of that data block.

In the example of FIG. 2, processing of Transaction 200 has been started by the disclosed transaction processing logic, and accordingly a lock has been obtained (or "set") by the disclosed transaction processing logic for each one of the Data Blocks 202 indicated by Transaction 200. For example, Lock 214 has been obtained for Data Block 204, Lock 216 has been obtained for Data Block 206, Lock 218 has been obtained for Data Block 208, and Lock 220 has been obtained for Data Block 210. As a result of the locks shown in FIG. 2, no node within the data storage system (e.g. no program logic executing in any node of the data storage system) can access the data stored in any of the data blocks that are indicated by Transaction 200 until the locks obtained for those data blocks are subsequently released (or "cleared") by the disclosed transaction processing logic at the completion of processing the transaction.

The data contents of the Data Blocks 202 may, for example, consist of or include host data that is indicated by or included in one or more write I/O operations within Host I/O Requests 101, and/or metadata that is generated by Data Storage System 100 while processing Host I/O Requests 101. Such metadata may, for example, include or consist of mapping metadata (e.g. a mapping tree or the like) that is generated by and/or used by mapping logic executing in one or more of the nodes (e.g. storage processors SP-A 102 and/or SP-B 120) of Data Storage System 100, and that identifies the locations of portions of physical non-volatile data storage (e.g. physical blocks or pages) that are mapped to corresponding portions of the logical address space (e.g. logical blocks) of one or more logical volumes that are accessed by Host I/O Requests 101, and that may be accessed during the processing of Host I/O Requests 101, and/or some other specific type of metadata.

Figure 3:
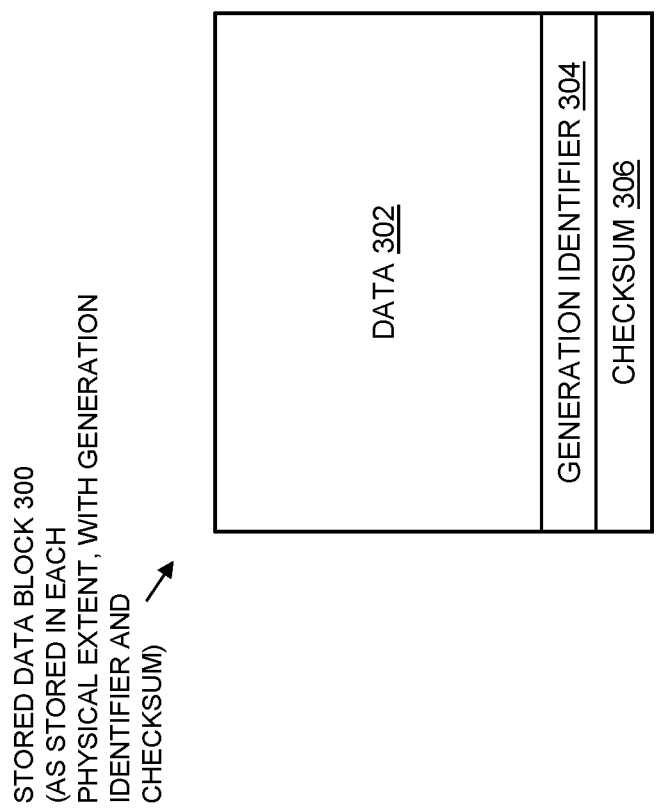
FIG. 3 is a block diagram showing a data block stored in non-volatile data storage together with a generation identifier and a checksum.

FIG. 3 is a block diagram showing an example format of a Stored Data Block 300 that is stored by the disclosed transaction processing logic in Non-Volatile Data Storage 150. For example, Transaction Processing Logic 112 may have mirrored Stored Data Block 300 to each physical extent in the Mirror Set 144 while processing one of Transactions 114, or Transaction Processing Logic 130 may have mirrored Stored Data Block 300 to each physical extent in the Mirror Set 144 while processing one of Transactions 132. In either case, as a result, a copy of Stored Data Block 300 is stored in each physical extent in the Mirror Set 144, e.g. in both Physical Extent 1 146 and Physical Extent 2 148.

In some embodiments, the disclosed transaction processing logic may store both a generation identifier and a checksum together with the data contents of a data block that is indicated by a transaction. For example, in the example of FIG. 3, Stored Data Block 300 includes the data contents of a data block indicated by a transaction (e.g. Data 302), as well as a Generation Identifier 304 and a Checksum 306. As described above, the Generation Identifier 304 is equal to the current value of a last transaction identifier at the time the data block was stored into non-volatile data storage, e.g. either the value of Last Transaction Identifier 116 in the case where Stored Data Block 300 was stored by Transaction Processing Logic 112, or the value of Last Transaction Identifier 134 in the case where Stored Data Block 300 was stored by Transaction Processing Logic 130. The Checksum 306 may be also be generated by the disclosed transaction processing logic by applying a checksum function to the Data 302 and the Generation Identifier 304.

When a data verification operation is subsequently performed by the disclosed transaction processing logic and/or other program logic executing on a node of the data storage system, the Checksum 306 may be used to validate both the Data 302 and the Generation Identifier 304 in each copy of Stored Data Block 300, in order to provide protection from data corruption. Next, in response to detecting that the value of Checksum 306 in all copies of the Stored Data Block 300 indicates that none of the copies of Stored Data Block 300 have been corrupted, the transaction processing logic then compares the values of Generation Identifier 304 in all the copies of Stored Data Block 300 in Mirror Set 144. In response to detecting that the values of Generation Identifier 304 in all copies of Stored Data Block 300 do not match, the transaction processing logic identifies a copy of Stored Data Block 300 that has the highest value of Generation Identifier 304 as the copy having the most current version of Data 302, and then overwrites other copies of Stored Data Block 300 having smaller values of Generation Identifier 304 with the copy of Stored Data Block 300 having the highest value of Generation Identifier 304, in order to bring all copies of Stored Data Block 300 in the Mirror Set 144 up to date.

Figure 4:
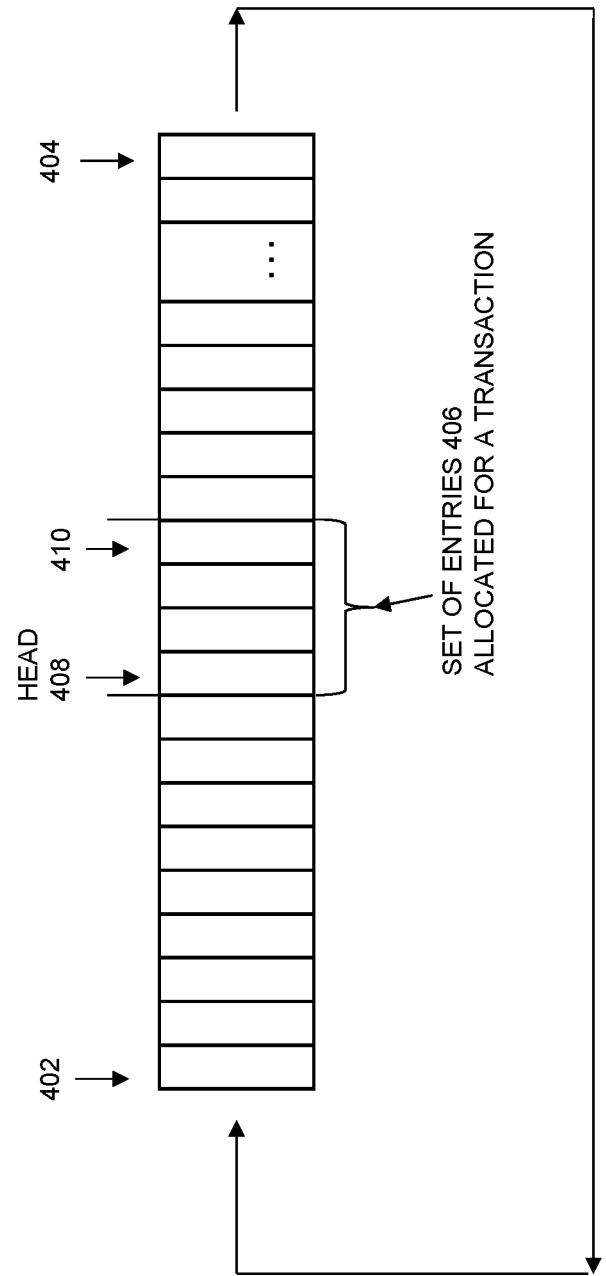
FIG. 4 is a block diagram showing a page descriptor buffer embodied as a ring of page descriptors.

FIG. 4 is a block diagram showing an example of a Page Descriptor Buffer 400. In the example of FIG. 4, Page Descriptor Buffer 400 is a ring data structure of reusable page descriptor entries. Each entry in Page Descriptor Buffer 400 is capable of storing a page descriptor for a data block indicated by a transaction. In the example of FIG. 4, the indices of the individual entries in Page Descriptor Buffer 400 increase from left to right, and continue to increase as the entries in the ring are each repeatedly i) allocated for use by the disclosed transaction processing logic to store page descriptors and ii) subsequently deallocated when the page descriptors they store are no longer needed. Accordingly, during a first traversal allocating the entries of Page Descriptor Buffer 400, the index of entry 402 may be 1, and the index of entry 404 may be equal to the total number of entries in Page Descriptor Buffer 400. On a second traversal, the index of entry 402 may be the total number of entries in Page Descriptor Buffer 400 plus 1, and the index of entry 404 may be equal to twice the total number of entries in Page Descriptor Buffer 400, and so on similarly for subsequent allocation traversals as the entries are repeatedly allocated and deallocated.

Entries in Page Descriptor Buffer 400 may, for example, be allocated from a Head 408, where Head 408 indicates the next entry that is available for allocation. Entries may also be deallocated for re-allocation from a tail (not shown). For example, a Set of Entries 406 allocated for a transaction being processed by the disclosed transaction processing logic may begin with the entry that is indicated by Head 408, and contain a total number of contiguous entries that is equal to the total number of data blocks indicated by the transaction being processed. For example, in the case of a transaction that indicates 4 data blocks, such as Transaction 200 in FIG. 4, Set of Entries 406 allocated for the transaction includes four entries starting at the Head 408. In such an example, each one of the entries in Set of Entries 406 is used by the disclosed transaction processing logic to store a page descriptor for one of the data blocks indicated by the Transaction 200, after the data blocks indicated by the Transaction 200 have been stored to non-volatile data storage, e.g. after the data blocks indicated by the Transaction 200 have been mirrored across all the physical extents in Mirror Set 144. For example, the contents of each page descriptor stored in one of the four entries in the Set of Entries 406 may include indications of the locations in non-volatile data storage of the copies of a corresponding one of the four data blocks indicated by the Transaction 200. After a page descriptor for each one of the data blocks indicated by the transaction has been written to a corresponding one of the entries in Set of Entries 406, the disclosed transaction processing logic uses the highest index of the indices of the entries in Set of Entries 406 to update the last transaction identifier. For example, in FIG. 4 the entry 410 is the entry in Set of Entries 406 with the highest index, and accordingly, the disclosed transaction processing logic updates the last transaction identifier by overwriting the last transaction identifier with the index of entry 410. For example, in the case of processing one of the Transactions 114, Transaction Processing Logic 112 overwrites Last Transaction Identifier 116 with the index of entry 410, while in the case of processing one of the Transactions 132, Transaction Processing Logic 130 overwrites Last Transaction Identifier 134 with the index of entry 410. In response to successfully updating the last transaction identifier, the disclosed transaction processing logic releases all the locks for the data blocks indicated by the transaction. For example, in the case of Transaction 200, the disclosed transaction processing logic releases Lock 214, Lock 216, Lock 218, and Lock 220, so that Data Block 204, Data Block 206, Data Block 208, and Data Block 210 are again accessible for the disclosed transaction processing logic executing in any node of the Data Storage System 100 to process another transaction that indicates one or more of Data Block 204, Data Block 206, Data Block 208, and/or Data Block 210.

FIG. 5 is a first flow chart illustrating steps that may be performed during operation of some embodiments. As shown in FIG. 5, at step 500, a transaction is generated that indicates at least one data block of a shared logical volume that is to be written to non-volatile data storage.

At step 502, a system-wide lock is obtained for each data block indicated by the transaction.

At step 504, a new generation identifier is created that is equal to a last transaction identifier that was created and stored during processing of a previously completed transaction.

At step 506, mirror copies of the data block(s) indicated by the transaction are stored into non-volatile data storage, such that the new generation identifier is stored with each mirror copy of each data block.

At step 508, a set of one or more entries in a page descriptor buffer are allocated to the transaction to store page descriptors for the data blocks indicated by the transaction.

At step 510, a page descriptor is stored in the page descriptor buffer for each data block indicated by the transaction.

At step 512, the last transaction identifier is updated to the highest index of the entries allocated to the transaction to store page descriptors for the data blocks indicated by the transaction.

At step 514, the transaction is completed by releasing the previously obtained lock(s) for the data block(s) indicated by the transaction. Step 514 may, for example, be considered part of what is generally referred to as a "commit" of the transaction, that makes the new versions of the data blocks indicated by the transaction that have been stored in the non-volatile data storage available for access from the non-volatile data storage.

FIG. 6 is a second flow chart illustrating steps that may be performed during operation of some embodiments. As shown in FIG. 6, at step 600, a transaction is generated indicating one or more data blocks to be stored into non-volatile data storage.

At step 602, a lock is obtained for each data block indicated by the transaction.

At step 604, a new generation identifier is created that is equal to the value of a last transaction identifier that was created and stored during processing of a previously completed transaction.

At step 606, each block indicated by the transaction is stored into non-volatile data storage together with the new generation identifier.

As will be appreciated by those skilled in the art, the technologies disclosed herein may be embodied as a system, method or computer program product. Accordingly, each specific feature of the present disclosure may be embodied using hardware, software (including firmware, resident software, micro-code, etc.) or a combination of software and hardware. Furthermore, the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art will readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media.

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
   generating a transaction that indicates one or more data blocks of a logical volume to be written to non-volatile data storage of a data storage system, wherein the logical volume is accessible to multiple nodes in the data storage system;
   obtaining a lock for each data block indicated by the transaction;
   creating a new generation identifier that is equal to a last transaction identifier that was created and stored during processing of a previously completed transaction;
   storing each data block indicated by the transaction into the non-volatile data storage of the data storage system together with the new generation identifier; and
   in response to successfully storing the one or more data blocks indicated by the transaction into the non-volatile data storage of the data storage system:
      allocating a set of one or more entries for the transaction in a page descriptor buffer for the logical volume to store page descriptors for the one or more data blocks indicated by the transaction;
      storing a page descriptor for each data block indicated by the transaction into a corresponding entry in the set of one or more entries allocated for the transaction in the page descriptor buffer; and
      updating the last transaction identifier to a highest index of the one or more entries in the set of one or more entries allocated for the transaction in the page descriptor buffer.

2. The method of claim 1, wherein storing each data block indicated by the transaction into the non-volatile data storage of the data storage system together with the new generation identifier comprises storing a separate copy of each data block indicated by the transaction together with the new generation identifier onto each one of multiple non-volatile data storage devices.

3. The method of claim 2, wherein storing the separate copy of each data block indicated by the transaction together with the new generation identifier onto each one of multiple non-volatile data storage devices comprises storing the separate copy of each data block indicated by the transaction together with the new generation identifier onto each one of a set of physical extents provisioned from the multiple non-volatile data storage devices.

4. The method of claim 1, wherein the multiple nodes in the data storage system include a single primary node, and wherein allocating the set of one or more entries for the transaction in the page descriptor buffer for the logical volume comprises:
 requesting the set of one or more entries for the transaction from page descriptor allocation logic executing exclusively in the primary node of the data storage system; and
 receiving an indication of the set of one or more entries for the transaction from the page descriptor allocation logic executing in the primary node, wherein the indication of the set of one or more entries for the transaction indicates the locations of each entry in the set of one or more entries within the page descriptor buffer.

5. The method of claim 4, wherein obtaining the lock for each data block indicated by the transaction comprises locking each data block indicated by the transaction across all nodes of the data storage system, such that each data block indicated by the transaction cannot be accessed by any of the multiple nodes in the data storage system to process any other transaction until the lock obtained for that data block is released.

6. The method of claim 5, further comprising, in response to the last transaction identifier being successfully updated with the highest index of the one or more entries in the set of one or more entries allocated for the transaction in the page descriptor buffer, releasing each lock previously obtained for each data block indicated by the transaction.

7. The method of claim 6, further comprising performing a data verification operation for a data block that was previously stored into non-volatile data storage of the data storage system at least in part by:
 comparing a generation identifier stored with a first copy of the previously stored data block to a generation identifier stored with a second copy of the previously stored data block; and
 in response to the generation identifier stored with the first copy of the previously stored data block being higher than the generation identifier stored with the second copy of the previously stored data block, overwriting the second copy of the previously stored data block with the first copy of the previously stored data block.

8. A data storage system, comprising:
 processing circuitry and memory coupled to the processing circuitry, the memory storing instructions, wherein the instructions, when executed by the processing circuitry, cause the processing circuitry to:
  generate a transaction that indicates one or more data blocks of a logical volume to be written to non-volatile data storage of a data storage system, wherein the logical volume is accessible to multiple nodes in the data storage system;
  obtain a lock for each data block indicated by the transaction;
  create a new generation identifier that is equal to a last transaction identifier that was created and stored during processing of a previously completed transaction; store each data block indicated by the transaction into the non-volatile data storage of the data storage system together with the new generation identifier; and
  in response to the one or more data blocks indicated by the transaction being successfully stored into the non-volatile data storage of the data storage system:
   allocate a set of one or more entries for the transaction in a page descriptor buffer for the logical volume to store page descriptors for the one or more data blocks indicated by the transaction,
   store a page descriptor for each data block indicated by the transaction into a corresponding entry in the set of one or more entries allocated for the transaction in the page descriptor buffer, and
   update the last transaction identifier to a highest index of the one or more entries in the set of one or more entries allocated for the transaction in the page descriptor buffer.

9. The data storage system of claim 8, wherein the instructions, when executed by the processing circuitry, further cause the processing circuitry to store each data block indicated by the transaction into the non-volatile data storage of the data storage system together with the new generation identifier at least in part by causing the processing circuitry to store a separate copy of each data block indicated by the transaction together with the new generation identifier onto each one of multiple non-volatile data storage devices.

10. The data storage system of claim 9, wherein the instructions, when executed by the processing circuitry, further cause the processing circuitry to store the separate copy of each data block indicated by the transaction together with the new generation identifier onto each one of multiple non-volatile data storage devices at least in part by causing the processing circuitry to store the separate copy of each data block indicated by the transaction together with the new generation identifier onto each one of a set of physical extents provisioned from the multiple non-volatile data storage devices.

11. The data storage system of claim 8, wherein the multiple nodes in the data storage system include a single primary node, and wherein the instructions, when executed by the processing circuitry, cause the processing circuitry to allocate the set of one or more entries for the transaction in the page descriptor buffer for the logical volume at least in part by causing the processing circuitry to:
 request the set of one or more entries for the transaction from page descriptor allocation logic executing exclusively in the primary node of the data storage system; and
 receive an indication of the set of one or more entries for the transaction from the page descriptor allocation logic executing in the primary node, wherein the indication of the set of one or more entries for the transaction indicates the locations of each entry in the set of one or more entries within the page descriptor buffer.

12. The data storage system of claim 11, wherein the instructions, when executed by the processing circuitry, further cause the processing circuitry to obtain the lock for each data block indicated by the transaction at least in part by causing the processing circuitry to lock each data block indicated by the transaction across all nodes of the data storage system, such that each data block indicated by the transaction cannot be accessed by any of the multiple nodes in the data storage system to process any other transaction until the lock obtained for that data block is released.

13. The data storage system of claim 12, wherein the instructions, when executed by the processing circuitry, further cause the processing circuitry to:
   in response to the last transaction identifier being successfully updated with the highest index of the one or more entries in the set of one or more entries allocated for the transaction in the page descriptor buffer, release each lock previously obtained for each data block indicated by the transaction.

14. The data storage system of claim 13, wherein the instructions, when executed by the processing circuitry, further cause the processing circuitry to perform a data verification operation for a data block that was previously stored into non-volatile data storage of the data storage system at least in part by causing the processing circuitry to:
   compare a generation identifier stored with a first copy of the previously stored data block to a generation identifier stored with a second copy of the previously stored data block; and
   in response to the generation identifier stored with the first copy of the previously stored data block being higher than the generation identifier stored with the second copy of the previously stored data block, overwrite the second copy of the previously stored data block with the first copy of the previously stored data block.

15. A computer program product, comprising:
   a non-transitory, computer-readable medium having instructions stored thereon that, when executed by processing circuitry in a data storage system, cause the processing circuitry to perform a method comprising the steps of:
   generating a transaction that indicates one or more data blocks of a logical volume to be written to non-volatile data storage of a data storage system, wherein the logical volume is accessible to multiple nodes in the data storage system;
   obtaining a lock for each data block indicated by the transaction;
   creating a new generation identifier that is equal to a last transaction identifier that was created and stored during processing of a previously completed transaction;
   storing each data block indicated by the transaction into the non-volatile data storage of the data storage system together with the new generation identifier; and
   in response to successfully storing the one or more data blocks indicated by the transaction into the non-volatile data storage of the data storage system:
      allocating a set of one or more entries for the transaction in a page descriptor buffer for the logical volume to store page descriptors for the one or more data blocks indicated by the transaction;
      storing a page descriptor for each data block indicated by the transaction into a corresponding entry in the set of one or more entries allocated for the transaction in the page descriptor buffer;
      and updating the last transaction identifier to a highest index of one or more entries in the set of one or more entries allocated for the transaction in the page descriptor buffer.

* * * * *